(12) United States Patent
Huang et al.

(10) Patent No.: US 6,805,198 B2
(45) Date of Patent: Oct. 19, 2004

(54) ORGANIC ACID SYSTEM FOR HIGH TEMPERATURE ACIDIZING

(75) Inventors: Tianping Huang, Spring, TX (US); Paul M. McElfresh, Spring, TX (US); Allen D. Gabrysch, Houston, TX (US)

(73) Assignee: Baker Hughes Incorporated, Houston, TX (US)

( * ) Notice: Subject to any disclaimer, the term of this patent is extended or adjusted under 35 U.S.C. 154(b) by 89 days.

(21) Appl. No.: 10/223,118

(22) Filed: Aug. 19, 2002

(65) Prior Publication Data

US 2003/0111225 A1 Jun. 19, 2003

Related U.S. Application Data

(60) Provisional application No. 60/318,146, filed on Sep. 7, 2001.

(51) Int. Cl.[7] .................................................. G21B 43/27
(52) U.S. Cl. .......................................... 166/307; 166/304
(58) Field of Search ............................... 166/271, 281, 166/282, 300, 304, 307

(56) References Cited

U.S. PATENT DOCUMENTS

| | | | |
|---|---|---|---|
| 4,213,866 A | * | 7/1980 | Ashby et al. ............... 507/241 |
| 4,512,552 A | | 4/1985 | Katayama et al. |
| 4,917,186 A | | 4/1990 | Mumallah |
| 5,293,939 A | * | 3/1994 | Surles et al. ................ 166/295 |
| 5,433,272 A | | 7/1995 | Baker |
| 6,531,427 B1 | * | 3/2003 | Shuchart et al. ............ 507/267 |

FOREIGN PATENT DOCUMENTS

| | | |
|---|---|---|
| EP | 0 878 605 A2 | 11/1998 |
| EP | 1 223 207 A1 | 7/2002 |
| GB | 2177439 A | 1/1987 |

OTHER PUBLICATIONS

L. J. Harp, et al., "Controlled Stimulation of Deep, Hot Wells With Binary and Trinary HCl–Organic Acid Blends", Producers Monthly, Sep. 1968, pp. 2–7, 25–26.

European Search Report for EPO Application No. 02 01 9579, Dec. 29, 2003.

* cited by examiner

*Primary Examiner*—Zakiya Walker
(74) *Attorney, Agent, or Firm*—Madan, Mossman & Sirram P.C.

(57) ABSTRACT

Dicarboxylic acids are useful in acidizing subterranean formations to improve their permeability, particularly at elevated temperature, e.g. between about 200° F. (92° C.) and about 400° F. (204° C.). Particularly suitable dicarboxylic acids include, but are not necessarily limited to, succinic acid, glutaric acid, adipic acid, and mixtures thereof.

12 Claims, No Drawings

ORGANIC ACID SYSTEM FOR HIGH TEMPERATURE ACIDIZING

CROSS-REFERENCE TO RELATED APPLICATION

This application claims the benefit of U.S. Provisional Application No. 60/318,146 filed Sep. 7, 2001.

FIELD OF THE INVENTION

The present invention relates to acidizing treatment fluids used during hydrocarbon recovery operations, and more particularly relates, in one embodiment, to methods of using acidizing methods during hydrocarbon recovery operations that have reduced corrosivity of equipment.

BACKGROUND OF THE INVENTION

Hydrocarbons sometimes exist in a formation but cannot flow readily into the well because the formation has very low permeability. Acidizing wells is a conventional process for increasing or restoring the permeability of subterranean formations so as to facilitate the flow of oil and gas from the formation into the well. This process involves treating the formation with an acid to dissolve fines and carbonate scale plugging or clogging the pores, thereby opening the pores and other flow channels and increasing the permeability of the formation. Continued pumping forces the acid into the formation, where it etches channels or wormholes. These channels provide ways for the formation hydrocarbons to enter the well bore.

Conventional acidizing fluids, such as hydrochloric acid or a mixture of hydrofluoric and hydrochloric acids, have high acid strength and quick reaction with fines and scale nearest the well bore, and have a tendency to corrode tubing, casing and down hole equipment, such as gravel pack screens and down hole pumps, especially at elevated temperatures. In addition, above 200° F. (92° C.), HCl is not recommended because of its destructive effect on the rock matrix. Due to the type of metallurgy, long acid contact times and high acid sensitivity of the formations, removal of the scale with hydrochloric acid and hydrochloric acid mixtures has been largely unsuccessful. There is a need to find an acid fluid system to dissolve the scale and remove the source of the fines through acidizing the surrounding formation and not damage the down hole equipment, particularly for high temperature wells.

It would be desirable if a composition and method could be devised to overcome some of the problems in the conventional acidizing methods and fluids.

SUMMARY OF THE INVENTION

Accordingly, it is an object of the present invention to provide a system and method for acidizing a subterranean formation that would have reduced corrosivity of the iron-alloy and other metal equipment used in connection with the system, as compared with conventional systems using hydrochloric acid.

It is another object of the present invention to provide a system and method for acidizing a subterranean formation that would acidize a formation at relatively high temperatures with reduced corrosion of iron-alloy equipment, as compared with conventional systems using hydrochloric acid, and which would acidize the formation more uniformly, rather than predominantly near the well bore.

In carrying out these and other objects of the invention, there is provided, in one form, a method for increasing the permeability of a subterranean formation involving injecting an acid composition into the subterranean formation where the acid composition comprises at least one dicarboxylic acid; and contacting the subterranean formation with the acid composition for a period of time effective to improve the permeability of the formation.

DETAILED DESCRIPTION OF THE INVENTION

The present invention provides an organic acid fluid system and method for matrix acidization of subterranean formations penetrated by a well bore at temperatures in excess of about 200° F. (92° C.). It has been discovered that a particularly useful organic acid fluid contains at least one water-soluble dicarboxylic acid. In one non-limiting embodiment of the invention, the dicarboxylic acid is of relatively low molecular weight, that is, has a formula weight of 175 or less. Suitable dicarboxylic acids therefore include, but are not necessarily limited to, oxalic acid (ethanedioic acid), malonic acid (propanedioic acid), succinic acid (butanedioic acid), glutaric acid (pentanedioic acid), adipic acid (hexanedioic acid), pimelic acid (heptanedioic acid), and mixtures thereof. In another, preferred embodiment of the invention, the dicarboxylic acids are selected from the group consisting of succinic acid, glutaric acid, adipic acid, and mixtures thereof. Interestingly, glutaric acid, succinic acid, and adipic acid have been used as components for corrosion inhibitors for ferrous metals, according to U.S. Pat. No. 4,512,552. Mixtures of succinic acid, glutaric acid, and adipic acid are generally available as a by-product stream.

The organic acid fluid systems of the invention can effectively generate wormholes to stimulate production in subterranean carbonate formations and dissolve carbonate scale, and these organic acids mixed with hydrofluoric acid can effectively remove fines to recover production in sandstone formations at elevated temperatures. This fluid has very low corrosion on the tubing, casing and down hole equipment.

Based on the properties of glutaric acid, succinic acid and adipic acid, this composition of dicarboxylic acids and other combinations of dicarboxylic acids (or dicarboxylic acids used alone) can be used as acid compositions to stimulate high temperature wells, according to the methods of the invention. A series of tests done on screens and clay-rich cores show that this organic acid system, which is advantageously highly biodegradable, can successfully remove the calcium carbonate scale and fines to stimulate production. Core flood testing demonstrates that this organic acid system can effectively remove calcium carbonate scales and fines at temperatures up to 400° F. (204° C.). In addition to its reactivity, the acid system, when combined with corrosion inhibitor, exhibits very low corrosion at high temperatures. Corrosion tests show that at 350° F. (177° C.) the corrosion rate caused by this organic acid is 0.001 lbs/ft$^2$ (0.005 kg/m$^2$) on 22-Cr for 16 hours. Acid soaking to completely remove scale prior to removal of fines is now possible at temperatures in excess of 200° F. (92° C.). In one non-limiting embodiment of the invention, a preferred operating temperature range is between about 300° F. (149° C.) and about 350° F. (177° C.). Successive removal of plugging fines from screens can then proceed without further damage to the integrity of the screen.

In some non-limiting embodiments of the invention, hydrofluoric acid may be used together with the dicarboxylic acids of the invention. Hydrofluoric acid may be used to aid in dissolving silicates. Alternatively, the invention may employ a substance that hydrolyzes to hydrofluoric acid. Suitable substances include, but are not necessarily limited to, ammonium bifluoride and ammonium fluoride, alkali metal fluorides and bifluorides (where the alkali metal is typically sodium, potassium or the like) as well as transition metal fluorides (for instance hexafluorotitanate salts and the like) and mixtures thereof.

In one non-limiting embodiment of the invention however, the acid composition involves an absence of excess fluoride.

It will be appreciated that it is difficult to specify with precision the amount of dicarboxylic acid that must be used to effectively acidize a particular subterranean formation. A number of complex, interrelated factors must be taken into account that would affect such a proportion, including but not necessarily limited to, the temperature of the formation, the pressure of the formation, the particular fines and scales present in the formation (e.g. calcium carbonate, silicates, and the like), the particular dicarboxylic acid(s) used, the expected contact time of the acid composition with the formation, etc.

For stimulation treatments, contact times are determined from the maximum pumping rate that does not cause the down hole pressure to exceed the fracturing pressure. This type of treatment is called a "matrix" acid job.

For scale/fines removal procedures, contact times are based on laboratory tests, but usually range from about 0.5 hour to about 2 hour with the most common time being about 0.5 hour.

Suitable solvents or diluents for the acid compositions of the invention include, but are not necessarily limited to, water, methanol, isopropyl alcohol, alcohol ethers, aromatic solvents, and mixtures thereof. In one non-limiting embodiment of the invention, the composition has an absence of monocarboxylic acids and/or an absence of tricarboxylic acids. Alternatively, in another embodiment of the invention, the acid composition has an absence of quaternary ammonium compounds and/or an absence of sulfur-containing corrosion inhibitor activator (e.g. thioglycolic acid, alkali metal sulfonate, etc.). As noted, a goal of the present invention is to avoid the use of strong mineral acids, such as HCl and/or $H_2SO_4$, so these acids should be absent from the acid composition in one preferred embodiment of the invention. The acid compositions of the present invention are intended to replace the mineral acid systems previously used, in one non-limiting aspect of the invention. The optional use of hydrofluoric acid (noted above) is an exception to these considerations about mineral acids.

The invention will be further illustrated with respect to certain experiments, but these examples are not intended to limit the invention, but only to further describe it in certain specific, non-limiting embodiments.

EXAMPLE 1

Dissolving Calcium Carbonate

At ambient temperature, 50 ml of a 10 wt % dibasic acid (DBA) acid solution (glutaric acid 51–61 wt %; succinic acid 18–28 wt %; adipic acid 15–25 wt %) was poured into a 100 ml beaker that contained a magnetic stirring bar. Reagent grade calcium carbonate powder (10.00 g) was weighed in a weighing boat. The calcium carbonate powder was slowly added in small increments to the beaker while stirring until the acid fluid just became cloudy. The remaining calcium carbonate powder was reweighed, and the amount dissolved was calculated by difference. By this method, 50 ml 10 wt % DBA acid was found to dissolve 2.7 g, which is equivalent to 0.45 lb/gal. This Example illustrates that DBA acid will dissolve calcium carbonate.

EXAMPLE 2

Dissolving Silicates

Since DBA acid alone does not dissolve silicates, DBA acid was used together with ammonium fluoride to generate hydrofluoric acid at high temperature. The test procedure was as follows:

1. A 1 inch diameter (2.54 cm), 400 mesh (37 micron) stainless steel screen, which is dry and weighed, was placed onto the surface of a one-inch diameter (2.54 cm) sandstone core, then the screen and core were put into a core holder;
2. A fluid which contains 2.5 wt % 400 mesh Rev Dust in water (components of Rev Dust: 12 wt % quartz; 7 wt % cristobalite; 4 wt % illite; 29 wt % mixed layer clay; 26 wt % kaolinite; 22 wt % chlorite) was pumped to plug the screen and damage the core;
3. The screen with Rev Dust on it was removed, and the screen was dried and weighed;
4. The screen was replaced back onto the core surface and the core was heated to 300° F. (149° C.);
5. A fluid of 10 wt % DBA plus 1.5 wt % hydrofluoric acid, generated from ammonium fluoride, and a corrosion inhibitor was pumped into the screen and core at 3 ml/min for 24 minutes; the core was then soaked for 12 minutes at 300° F. (149° C.);
6. The core was cooled to room temperature, the screen was removed from the core holder, and the screen was dried and reweighed.

After pumping 72 ml of the DBA:HF fluid described above, 0.5 g of Rev Dust on the screen was removed, which is equivalent to 0.058 lb Rev Dust dissolved per gallon of acid at 300° F. (149° C.).

Tables I through VI report corrosion inhibitor test results mentioned previously. All tests were run at 2000 psi pressure (14 MPa), and corrosion inhibitor aid 3% $NH_4Cl$ was present in the formulations. The steel alloys used were 22-Cr chromium steel and coiled tubing of N-80 steel (CT).

With respect to the corrosion rate, 0.05 $lb/ft^2$ (2.4 $kg/m^2$) is the maximum acceptable.

The pitting index is a measure of corrosion, where pits are small pockets of localized corrosion about 0.1 mm in diameter or less usually caused by relatively low corrosion inhibitor concentration or galvanic currents. The pitting index definitions are as follows:

| | |
|---|---|
| Low corrosion inhibitor conc.: | 0 = No pitting<br>1, 2, 3, 4 = Edge pitting and number of edges |
| Galvanic currents | 5 = Isolated pits on one surface<br>6 = Isolated pits on two surfaces |

TABLE I

Corrosion Inhibitor #1 Test Results - Temperature 300° F. (149° C.)

| Ex. | Formulation | Conc. gpt | Time hrs | Alloy | Corrosion Rate lb/ft² | Corrosion Rate kg/m² | Pitting index |
|---|---|---|---|---|---|---|---|
| 3 | 10% DBA | 10 | 6 | 22-Cr | 0.002 | 0.010 | 2 |
| 4 | 10% DBA | 10 | 6 | CT | 0.007 | 0.034 | 2 |
| 5 | 5% DBA | 10 | 6 | 22-Cr | 0.001 | 0.005 | 2 |
| 6 | 10% DBA | 20 | 16 | 22-Cr | 0.002 | 0.010 | 1 |
| 7 | 10% DBA | 20 | 16 | CT | 0.010 | 0.049 | 1 |
| 8 | 5% DBA | 20 | 16 | 22-Cr | 0.001 | 0.005 | 1 |
| 9 | 5% DBA | 10 | 6 | CT | 0.005 | 0.024 | 2 |
| 10 | 5% DBA | 20 | 16 | CT | 0.007 | 0.034 | 1 |

TABLE II

Corrosion Inhibitor #1 Test Results - Temperature 325° F. (163° C.)

| Ex. | Formulation | Conc. gpt | Time hrs | Alloy | Corrosion Rate lb/ft² | Corrosion Rate kg/m² | Pitting index |
|---|---|---|---|---|---|---|---|
| 11 | 10% DBA | 20 | 6 | 22-Cr | 0.001 | 0.005 | 2 |
| 12 | 5% DBA | 20 | 6 | CT | 0.007 | 0.034 | 2 |
| 13 | 10% DBA | 20 | 6 | CT | 0.009 | 0.044 | 2 |
| 14 | 10% DBA | 20 | 16 | 22-Cr | 0.001 | 0.005 | 1 |
| 15 | 10% DBA | 20 | 16 | CT | 0.011 | 0.054 | 1 |
| 16 | 5% DBA | 20 | 16 | 22-Cr | 0.001 | 0.005 | 1 |
| 17 | 5% DBA | 20 | 16 | CT | 0.009 | 0.044 | 1 |
| 18 | 5% DBA | 20 | 6 | CT | 0.001 | 0.005 | 2 |

TABLE III

Corrosion Inhibitor #1 Test Results - Temperature 350° F. (177° C.)

| Ex. | Formulation | Conc. gpt | Time hrs | Alloy | Corrosion Rate lb/ft² | Corrosion Rate kg/m² | Pitting index |
|---|---|---|---|---|---|---|---|
| 19 | 5% DBA | 20 | 6 | CT | 0.010 | 0.049 | 3 |
| 20 | 5% DBA | 20 | 6 | 22-Cr | 0.001 | 0.005 | 2 |
| 21 | 10% DBA | 20 | 6 | 22-Cr | 0.001 | 0.005 | 2 |
| 22 | 10% DBA | 20 | 6 | CT | 0.010 | 0.049 | 3 |
| 23 | 10% DBA | 20 | 16 | CT | 0.014 | 0.068 | 3 |
| 24 | 5% DBA | 20 | 16 | CT | 0.008 | 0.039 | 2 |
| 25 | 10% DBA | 20 | 16 | 22-Cr | 0.001 | 0.005 | 2 |
| 26 | 5% DBA | 20 | 16 | 22-Cr | 0.001 | 0.005 | 2 |
| 26a | 10% DBA | 15 | 6 | 22-Cr | 0.001 | 0.005 | 0 |
| 26b | 10% DBA | 15 | 16 | 22-Cr | 0.001 | 0.005 | 0 |

TABLE IV

Corrosion Inhibitor #2 Test Results - Temperature 300° F. (149° C.)

| Ex. | Formulation | Conc. gpt | Time hrs | Alloy | Corrosion Rate lb/ft² | Corrosion Rate kg/m² | Pitting index |
|---|---|---|---|---|---|---|---|
| 27 | 5% DBA | 20 | 6 | 22-Cr | 0.001 | 0.005 | 2 |
| 28 | 5% DBA | 20 | 16 | CT | 0.006 | 0.029 | 1 |
| 29 | 5% DBA | 20 | 6 | CT | 0.005 | 0.024 | 2 |
| 30 | 5% DBA | 20 | 16 | 22-Cr | 0.001 | 0.005 | 1 |
| 31 | 10% DBA | 20 | 16 | CT | 0.010 | 0.049 | 1 |
| 32 | 10% DBA | 20 | 6 | 22-Cr | 0.001 | 0.005 | 2 |
| 33 | 10% DBA | 20 | 16 | 22-Cr | 0.001 | 0.005 | 1 |
| 34 | 10% DBA | 20 | 6 | CT | 0.008 | 0.039 | 2 |

TABLE V

Corrosion Inhibitor #2 Test Results - Temperature 325° F. (163° C.)

| Ex. | Formulation | Conc. gpt | Time hrs | Alloy | Corrosion Rate lb/ft² | Corrosion Rate kg/m² | Pitting index |
|---|---|---|---|---|---|---|---|
| 35 | 10% DBA | 20 | 16 | 22-Cr | 0.005 | 0.024 | 1 |
| 36 | 5% DBA | 20 | 6 | 22-Cr | 0.001 | 0.005 | 2 |
| 37 | 10% DBA | 20 | 6 | 22-Cr | 0.001 | 0.005 | 2 |
| 38 | 10% DBA | 20 | 6 | CT | 0.009 | 0.044 | 2 |
| 39 | 5% DBA | 20 | 16 | CT | 0.009 | 0.044 | 1 |
| 40 | 5% DBA | 20 | 6 | CT | 0.006 | 0.029 | 2 |
| 41 | 10% DBA | 20 | 16 | CT | 0.014 | 0.068 | 1 |
| 42 | 5% DBA | 20 | 16 | 22-Cr | 0.001 | 0.005 | 1 |

TABLE VI

Corrosion Inhibitor #2 Test Results - Temperature 350° F. (177° C.)

| Ex. | Formulation | Conc. gpt | Time hrs | Alloy | Corrosion Rate lb/ft² | Corrosion Rate kg/m² | Pitting index |
|---|---|---|---|---|---|---|---|
| 43 | 10% DBA | 20 | 6 | 22-Cr | 0.001 | 0.005 | 2 |
| 44 | 10% DBA | 20 | 16 | 22-Cr | 0.001 | 0.005 | 2 |
| 45 | 10% DBA | 20 | 6 | CT | 0.011 | 0.054 | 1 |
| 46 | 10% DBA | 20 | 16 | CT | 0.017 | 0.083 | 1 |
| 47 | 5% DBA | 20 | 6 | CT | 0.008 | 0.039 | 1 |
| 48 | 5% DBA | 20 | 6 | 22-Cr | 0.001 | 0.005 | 2 |
| 49 | 5% DBA | 20 | 16 | 22-Cr | 0.001 | 0.005 | 2 |
| 50 | 5% DBA | 20 | 16 | CT | 0.013 | 0.063 | 1 |
| 51 | 10% DBA | 0 | 6 | 22-Cr | 0.002 | 0.010 | 0 |
| 52 | 10% DBA | 0 | 16 | 22-Cr | 0.002 | 0.010 | 0 |

In the foregoing specification, the invention has been described with reference to specific embodiments thereof, and has been demonstrated as effective in providing an acidizing treatment fluid that has low corrosivity with respect to the iron-alloy materials and equipment it comes into contact with. However, it will be evident that various modifications and changes can be made thereto without departing from the broader spirit or scope of the invention as set forth in the appended claims. Accordingly, the specification is to be regarded in an illustrative rather than a restrictive sense. For example, specific combinations of dicarboxylic acids and other components falling within the claimed parameters, but not specifically identified or tried in a particular composition or under specific conditions, are anticipated to be within the scope of this invention.

We claim:

1. A method for increasing the permeability of a subterranean formation comprising:
    injecting an acid composition into the subterranean formation where the acid composition comprises at least one dicarboxylic acid; and
    contacting the subterranean formation with the acid composition for an effective period of time to improve the permeability of the formation in the absence of a mineral acid, except hydrofluoric acid.

2. The method of claim 1 where in injecting the acid composition, the acid composition comprises at least one dicarboxylic acid having a formula weight of 175 or less.

3. The method of claim 1 where in injecting the acid composition, the acid composition comprises a dicarboxylic acid selected from the group consisting of succinic acid, glutaric acid, adipic acid, and mixtures thereof.

4. The method of claim 1 where the contacting is conducted at a temperature between about 200° F. (92° C.) and about 400° F. (204° C.).

5. The method of claim 1 where in contacting the subterranean formation the permeability improvement is achieved by a process selected from the group consisting of etching channels, dissolving scale, removing fines, and combinations thereof.

6. The method of claim 1 where the acid composition further comprises hydrofluoric acid or a substance that hydrolyzes to hydrofluoric acid.

7. A method for increasing the permeability of a subterranean formation comprising:

injecting an acid composition into the subterranean formation where the acid composition comprises at least one dicarboxylic acid having a formula weight of 175 or less; and contacting the subterranean formation with the acid composition at a temperature between about 200° F. (92° C.) and about 400° F. (204° C.) for an effective period of time to improve the permeability of the formation in the absence of a mineral acid, except hydrofluoric acid.

8. The method of claim 7 where in injecting the acid composition, the acid composition comprises a dicarboxylic acid selected from the group consisting of succinic acid, glutaric acid, adipic acid, and mixtures thereof.

9. The method of claim 7 where in contacting the subterranean formation the permeability improvement is achieved by a process selected from the group consisting of etching channels, dissolving scale, removing fines, and combinations thereof.

10. The method of claim 7 where the acid composition further comprises hydrofluoric acid or a substance that hydrolyzes to hydrofluoric acid.

11. A method for increasing the permeability of a subterranean formation comprising:

injecting an acid composition into the subterranean formation where the acid composition comprises at least one dicarboxylic acid selected from the group consisting of succinic acid, glutaric acid, adipic acid, and mixtures thereof; and contacting the subterranean formation with the acid composition at a temperature between about 200° F. (92° C.) and about 400° F. (204° C.) for an effective period of time to improve the permeability of the formation, where the permeability improvement is achieved by a process selected from the group consisting of etching channels, dissolving scale, removing fines, and combinations thereof.

12. The method of claim 11 where the acid composition further comprises hydrofluoric acid or a substance that hydrolyzes to hydrofluoric acid.

* * * * *